(12) United States Patent
Zhao et al.

(10) Patent No.: US 8,942,556 B2
(45) Date of Patent: Jan. 27, 2015

(54) OPTICAL TRANSCEIVER INTEGRATED WITH OPTICAL TIME DOMAIN REFLECTOMETER MONITORING

(75) Inventors: Fuqiang Zhao, Chengdu (CN); Yi Yang, Chengdu (CN); Yong Lu, Chengdu (CN)

(73) Assignee: Source Photonics, Inc., Chatsworth, CA (US)

( * ) Notice: Subject to any disclaimer, the term of this patent is extended or adjusted under 35 U.S.C. 154(b) by 613 days.

(21) Appl. No.: 13/309,983

(22) Filed: Dec. 2, 2011

(65) Prior Publication Data

US 2012/0243863 A1    Sep. 27, 2012

(30) Foreign Application Priority Data

Mar. 24, 2011  (CN) .......................... 2011 1 0071513

(51) Int. Cl.
*H04B 10/08* (2006.01)
*H04B 10/272* (2013.01)
*H04B 10/071* (2013.01)
*H04B 10/40* (2013.01)
*H04B 10/00* (2013.01)

(52) U.S. Cl.
CPC ............ *H04B 10/272* (2013.01); *H04B 10/071* (2013.01); *H04B 10/40* (2013.01)
USPC ................. 398/21; 398/17; 398/22

(58) Field of Classification Search
CPC ...................................... H04B 10/071
USPC .................. 398/21, 17, 22; 356/73.1
See application file for complete search history.

(56) References Cited

U.S. PATENT DOCUMENTS

2007/0242954 A1* 10/2007 Sackman ......................... 398/71
2011/0013904 A1*  1/2011 Khermosh et al. .............. 398/16
2012/0020672 A1*  1/2012 Aguren .......................... 398/139

* cited by examiner

*Primary Examiner* — Daniel Dobson
(74) *Attorney, Agent, or Firm* — Andrew D. Fortney; Central California IP Group, P.C.

(57) ABSTRACT

An optical transceiver having an integrated optical time domain reflectometer monitoring unit and methods for using the same are disclosed. The disclosure relates to an optical transceiver comprising an optical device comprising a wavelength division multiplexing system (WDM), a data signal driver, a data signal limiting amplifier, and an optical time domain reflectometer (OTDR) data processing module. Furthermore, the optical transceiver is particularly advantageous in an optical line terminal (OLT) and/or a passive optical network (PON). The integrated OTDR data processing module can protect the optical transceiver, ensure successful monitoring data, simplify network wiring and decrease system and network costs by decreasing the number of OTDR modules and WDM units.

21 Claims, 3 Drawing Sheets

(Background)

(Background)

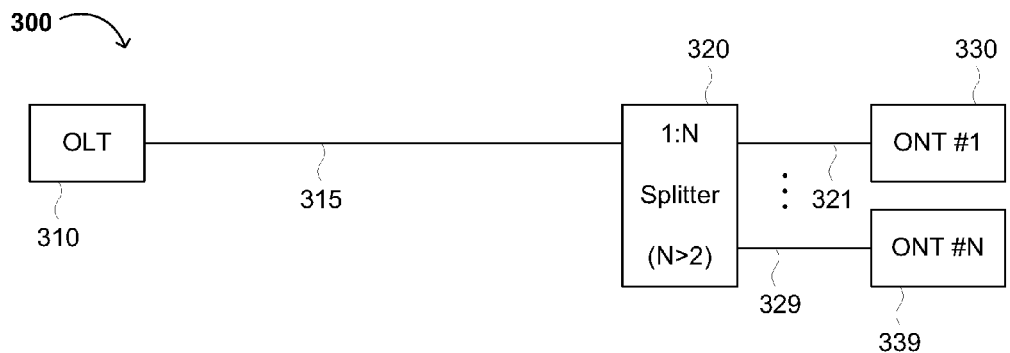
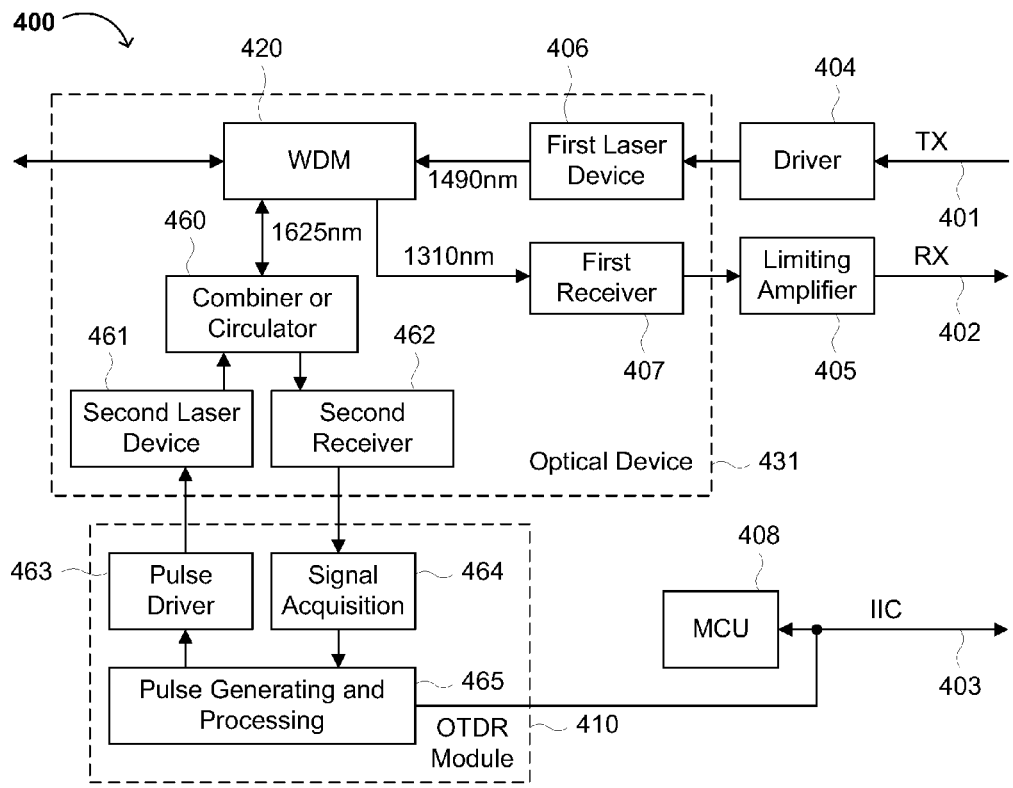

OPTICAL TRANSCEIVER INTEGRATED WITH OPTICAL TIME DOMAIN REFLECTOMETER MONITORING

CROSS REFERENCE TO RELATED APPLICATION

This application claims the benefit of Chinese Patent Application No. 201110071513.8, which was filed on Mar. 24, 2011, and is hereby incorporated by reference as if fully set forth herein.

FIELD OF THE INVENTION

The present invention generally relates to the field of passive optical networks and optical time domain reflectometer (OTDR) fiber testing. More specifically, embodiments of the present invention pertain to an optical transceiver with integrated OTDR monitoring, useful as an optical line terminal (OLT), and methods of manufacturing such optical transceivers.

DISCUSSION OF THE BACKGROUND

With increasing demand for data, voice/audio, video and other services, such as high-definition Internet protocol television (IPTV) and multi-media release systems, demanding higher bandwidth for passive optical network access technology is widely applied. A passive optical network (PON) refers to an optical distribution network (ODN) with neither active electronic network devices nor a dedicated electronic power supply. However, since the ODN does not require any active electronic devices, the ODN uses one or more passive devices, such as a splitter.

Typically, the passive optical network includes (i) an optical line terminal (OLT) unit that is located in a central control station, and (ii) a number of corresponding optical network units (ONUs) that are located in end user units. Generally, between the OLT and the ONU, the ODN includes fibers and a passive optical splitter or coupler.

In general, OTDR technology can be used to monitor fiber performance (e.g., to monitor or determine the occurrence of fiber fusion splices, connections, or breakages). Optical pulse signals are transmitted or input to a fiber input terminal. Then, fiber-reflected optical signals are collected at a high speed at or from the fiber input terminal to obtain a series of sample data points. Each sample data point represents a reflected optical power at a certain point in the fiber. The relationship between fiber attenuation and fiber length is obtained by plotting the distance between the fiber input terminal and each sample data point along the abscissa (e.g., x-axis) and the reflected optical power value of each sampling point along the ordinate (e.g., y-axis), so that the performance (e.g., reflected optical power as a function of distance) of the tested fiber can be determined.

FIG. 1 shows a conventional passive optical network 100 including an optical time domain reflectometer (OTDR) 110 that monitors the network 100. The OTDR equipment 110 couples a test signal into a passive optical network (PON) through a wavelength division multiplexing (WDM) system 120. The WDM system 120 is located outside of the optical line terminal (OLT) 130. In the PON system 100, a signal 140 having a wavelength of 1490 nm is issued by the OLT 130 to each optical network terminal (ONT) or optical network unit (ONU) 140-149 via corresponding fibers 125 and 161-169 through a splitter 160. The operating wavelength of the ONUs 140-149 is 1310 nm. Each ONU 141-149 can send data to the OLT 130 through a time division multiplexer (TDM; not shown). A signal 115 from the OTDR equipment 110 has a wavelength of 1625 nm, which is transmitted or inputted into the fiber 125 via the WDM to test the performance of the fiber.

FIG. 2 shows a conventional OLT 130. The major external signals for the optical transceiver 130 include a transmitter signal (TX) 201, a receiver signal (RX) 202, and an inter-integrated circuit (IIC) signal 203. The TX signal 201 is a high speed signal sent to the optical transceiver 130 from an external device to a driver 204, which drives a laser 206 to transmit a beam having a wavelength of 1490 nm into a fiber 240, and subsequently output via WDM 220. The WDM 220 also produces and/or transmits a beam having a wavelength of 1310 nm to a receiver 207 via a fiber 250. The beam is converted into an electronic signal and output as a high speed RX signal 202 through a limiting amplifier 205. The limiting amplifier 205 amplifies and reshapes the received signal 235 from the optical device 230. An inter-integrated circuit interface 203 coupled with a microcontroller unit (MCU) 208 is used for the optical transceiver 230, which monitors data and reports the same to an external device (not shown) over the IIC interface 203.

Referring back to FIG. 1, the conventional passive optical network 100 uses existing equipment currently on the market. Generally, the OTDR equipment 110 is relatively expensive and difficult for placement and wiring in a server room, especially when adding additional WDMs 120 and OTDR equipment 110 to the conventional passive optical network 100.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to an optical transceiver comprising an optical device comprising a wavelength division multiplexor or multiplexing system (WDM), a data signal driver, a data signal limiting amplifier, and an optical time domain reflectometer (OTDR) data processing module. Furthermore, the present optical transceiver integrates the OTDR data processing module to advantageously protect the optical transceiver and guarantee successful monitoring of data. The present invention advantageously minimizes and/or avoids (i) high costs associated with conventional OTDR equipment and (ii) difficulties in wiring such equipment (e.g., in an optical line terminal [OLT] and/or a passive optical network PON]).

Embodiments of the present invention further relate to or include a WDM comprising a first band, a second band, and a third band, which may have wavelengths at 1310 nm, 1490 nm, and 1625 nm, respectively. The first band (which may have a wavelength at 1310 nm) may be used to receive signals issued by an optical network unit (ONU). Subsequently, a first receiver converts the signals into an electronic signal output. A second band (which may have a wavelength at 1490 nm) may be used to accommodate an output signal from the transceiver or OLT, while the data signal driver drives a first laser device to output the optical signal. While the third band may be the operating wavelength of the OTDR (e.g., at 1625 nm), a second laser device issues the OTDR test signal, and a second receiver receives the fiber-reflected OTDR test signal.

The OTDR test signal issued by the second laser device may be coupled to the WDM via a combiner or a circulator, while the second receiver receives the fiber-reflected OTDR test signal via the same or different combiner or circulator.

Furthermore, in embodiments of the present invention, the data signal driver drives an output signal from a data signal source to a first laser device for transmission to one or more external devices (e.g., in the PON). For example, a PON data signal may be used as the signal source of the first laser device. In various embodiments, a limiting amplifier amplifies, reshapes, and/or outputs an electronic signal outputted from the first receiver. In further embodiments, a pulse signal is generated by the OTDR data processing module and is used as the signal source of a second laser device via a pulse driver. The second receiver converts the fiber-reflected signal into an electronic signal. Subsequently, the electronic signal is amplified and/or converted into a digital signal via a high speed analog-to-digital converter (ADC) within the OTDR data processing module.

According to one embodiment of the present invention, the WDM receives signals from the ONU and subsequently separates the signals having different wavelengths to obtain a first wavelength signal and a second wavelength signal. The signal beam having the first wavelength is separated by the WDM for a first receiver, whereas the signal beam having the second wavelength may be separated by the WDM and an optical splitter interface. The optical splitter has a second output terminal that has an interface with the second receiver to receive the second wavelength signal reflected back by the fiber. In addition, the optical splitter has a first output terminal interface with the first laser device to treat the second wavelength signal from the first laser device in a coupled output.

Alternatively, the second wavelength signal having the second wavelength is separated by the WDM and an optical circulator or circulator interface. The circulator may have (1) a second output terminal interface with the second receiver, which receives the second wavelength signal reflected back by the fiber, and (2) a second input terminal that interfaces with the first laser device. The OTDR data processing module treats the second wavelength signal from the first laser device in the coupled output.

According to embodiments of the present invention, an OTDR data processing system may comprise a signal acquisition module, a pulse driver module, and a pulse signal generating and processing module.

Thus, the present optical transceiver, having an integrated OTDR monitoring system, advantageously protects conventional optical transceivers and guarantees successful monitoring of data (e.g., via an IIC interface). Furthermore, embodiments of the present invention can advantageously simplify network wiring and decrease system and network costs by decreasing the number of OTDR devices and WDM units.

These and other advantages of the present invention will become readily apparent from the detailed description of various embodiments below.

BRIEF DESCRIPTION OF THE DRAWINGS

FIG. 3 is a diagram showing an exemplary passive optical network (PON) in accordance with the present invention.

FIG. 4 is a diagram showing an exemplary optical time domain reflectometer (OTDR) monitoring system in accordance with the present invention, in which optical pulses with a wavelength other than the network operating wavelengths are utilized for OTDR monitoring.

DETAILED DESCRIPTION

Reference will now be made in detail to various embodiments of the invention, examples of which are illustrated in the accompanying drawings. In order to achieve the objectives, technical solutions and advantages of the present invention more clearly, further details of the invention are described below with regard to the Figures. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

For the sake of convenience and simplicity, the terms "device," "transmitter" and "transceiver" are generally used interchangeably herein, but are generally given their art-recognized meanings. Also, for convenience and simplicity, the terms "optical device," "optoelectronic device," "optical transceiver," and "optoelectronic transceiver" are generally used interchangeably herein, and generally include an optical receiver and/or optical transmitter, but are generally given their art-recognized meanings. Furthermore, for convenience and simplicity, the terms "optical signal" and "light" may be used interchangeably, as may the terms "connected to," "coupled with," "coupled to," and "in communication with" (which terms also refer to direct and/or indirect relationships between the connected, coupled and/or communicating elements unless the context of the term's use unambiguously indicates otherwise), but these terms are also generally given their art-recognized meanings.

Furthermore, all characteristics, measures or processes disclosed in this document, except characteristics and/or processes that are mutually exclusive, can be combined in any manner and in any combination possible. Any characteristic disclosed in the present specification, claims, Abstract and/or figures can be replaced by other equivalent characteristics or characteristics with similar objectives, purposes and/or functions, unless specified otherwise. Each characteristic is generally only an embodiment of the invention disclosed herein.

Figure 1:
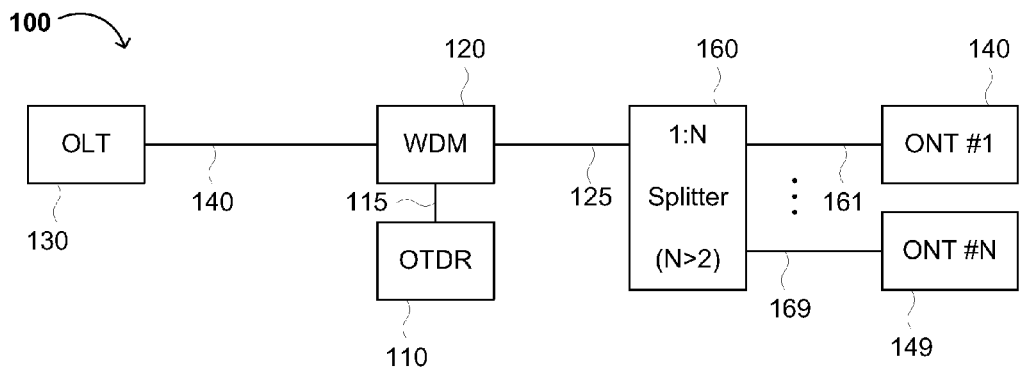
FIG. 1 is a schematic diagram showing optical time domain reflectometer (OTDR) monitoring of a conventional passive optical network (PON).
Figure 2:
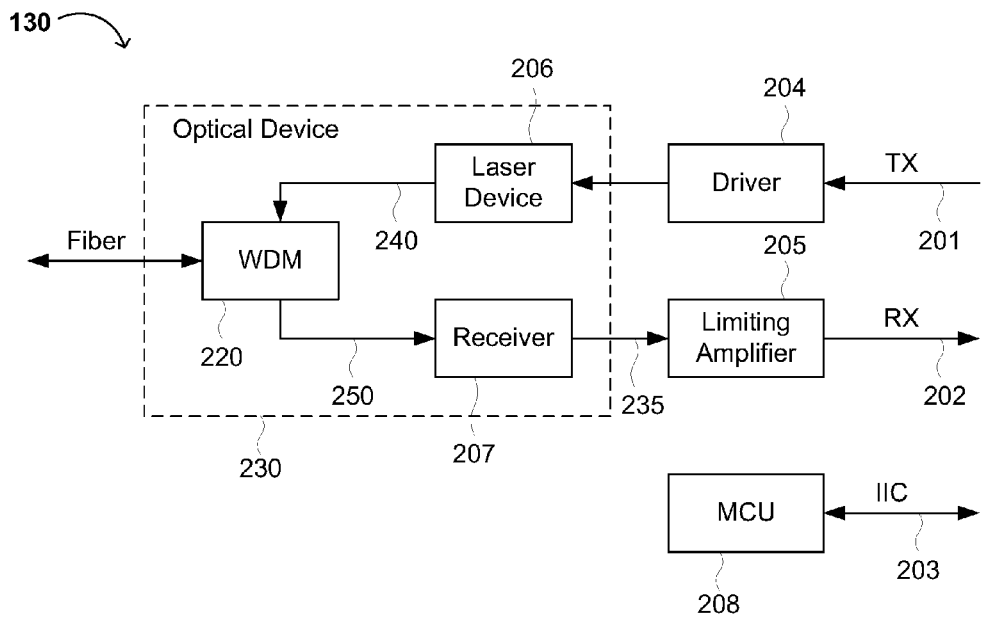
FIG. 2 is a block diagram showing a conventional optical line terminal (OLT).

FIG. 3 shows a wiring structure of a passive optical network (PON) in accordance with the present invention. In the PON system 300, a signal is issued by an optical line terminal (OLT) 310 to each optical network unit (ONU) or optical network terminal (ONT) 330-339 via corresponding fibers 315 and 321-329 through a 1:N splitter 320. In the network 300, N may be an integer of at least 2 (e.g., 2, 4, 8, 9, 16, 32, etc.). Decreasing the amount of OTDR equipment and WDMs advantageously reduces cost and wiring difficulties in the PON system 300, relative to the conventional PON system 100 of FIG. 1.

FIG. 4 illustrates an exemplary optical line terminal (OLT) 400 in accordance with one embodiment of the present invention, in which the optical test pulses have a wavelength (e.g., 1625 nm) different from the passive optical network (PON) operating wavelengths (e.g., 1310 nm and 1490 nm). The optical transceiver 400 comprises an optical device 431 comprising a wavelength division multiplexor (WDM) 420, a data signal driver 404, a data signal limiting amplifier 405, and an optical time domain reflectometer (OTDR) data processing module 410.

Optical device 431 includes the WDM 420, which in one embodiment is a three band WDM 420. The three band WDM 420 includes a first band having a first wavelength (e.g., at 1310 nm), a second band having a second wavelength (e.g., at 1490 nm), and a third band having a third wavelength (e.g., at 1625 nm). The first band of the WDM 420 may receive signals issued by the ONU or the ONT (not shown). Subsequently, a first receiver 407 converts the received signals into an electronic signal, output as a high speed RX signal 402 through the limiting amplifier 405.

The second band of the WDM 420 accommodates an optical signal output from the OLT 400. The driver 404 drives a laser in a first laser device 406 in the optical device 431 to output the optical signal. The third band is an operating wavelength of the OTDR. The third band accommodates an OTDR test signal issued by a second laser device 461 coupled to the WDM 420 via a combiner or a circulator 460. A second receiver 462 (also coupled to the combiner or circulator 460) transmits received fiber-reflected signals from the WDM 420 (via the combiner or circulator 460) to the OTDR 410.

A transceiver signal (TX) 401 is a high speed signal sent to the driver 404 in the optical transceiver 400 from an external device (not shown). Driver 404 drives an output signal from a network data signal (e.g., TX 401) through a first laser device 406. Thus, the network data signal is used as the signal source of the first laser device 406. An electronic signal is outputted as a high speed receiver signal (RX) 402 from a first receiver 407 through the limiting amplifier 405. The limiting amplifier 405 amplifies, reshapes and/or outputs the received signal from the first receiver 407. An inter-integrated circuit interface 403 coupled to a microcontroller unit (MCU) 408 is used for the optical transceiver 400, which monitors data and reports the same to an external device (not shown) over the IIC interface 403.

A pulse signal is generated by the OTDR data processing module (e.g., a pulse generating and a signal processing module) 465 and is used as the signal source of the second laser device 461 via a pulse driver 463. The second receiver 462 converts a fiber-reflected signal into an electronic signal via a signal acquisition block or module 464, which is subsequently amplified and converted into a digital signal via a high speed analog-to-digital converter (ADC; not shown) within the data processing module 465.

As a result, the data of a series of sampling data points (e.g., from the signal reflected from the fiber, through the WDM 420, second receiver 462, and OTDR data processing module 410) can be calculated, each of which represents the reflected optical power value at a given point in a fiber. The process described above in FIG. 4 can be repeated several times to sum up the data corresponding to the sampling data points. Such data can be digitally filtered using a finite impulse response [FIR] filter (which may be digital) or other conventional filtering device or method to reduce noise. Subsequently, the filtered data is plotted along an ordinate (e.g., y-axis) to represent the reflected optical power of each sampling data point. As the optical signal travels at a given rate, the length of the fiber can be calculated via the sampling time of the sampling data points.

Thus, an OTDR testing curve can be generated from (i) the reflected optical power relative to the sampling points decibel (dB) value as the ordinate, and (ii) the position calculated from the travel time between the sampling points at which they are located on the test fiber as the abscissa (e.g., x-axis). The OTDR testing curve is subsequently reported via the OTDR module 410, preferably via the inter-integrated circuit (IIC) interface 403 coupled to the microcontroller unit 408. The IIC 403 is used as an interface for the optical transceiver 400, through which data is reported to and information is monitored from an external device (not shown).

In various embodiments of the present invention, the OTDR module 410 is integrated in the OLT and/or optical transceiver 400, so that the integrated level of the network system is enhanced, and the network wiring is simplified. Thus, the invention can use conventional optical transceiver components and/or circuits without change or modification.

Figure 5:
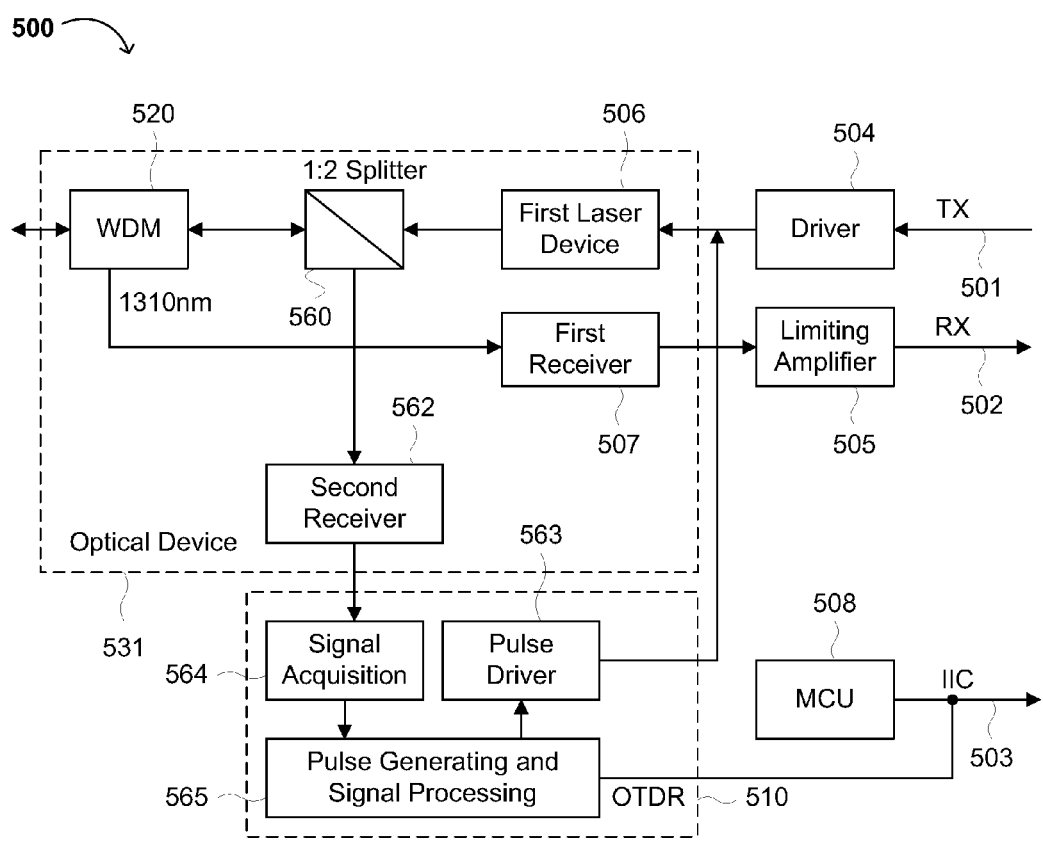
FIG. 5 is a diagram showing an exemplary wavelength division multiplexing (WDM) device in accordance with the present invention, for receiving signals from the optical network unit and separating signals having different wavelengths.

Alternatively, FIG. 5 shows an exemplary OLT 500 in accordance with another embodiment of the present invention, comprising an optical device 531, a data signal driver 504, a data signal limiting amplifier 505, and an OTDR data processing module 510, in which a WDM 520 receives signals from the ONU or ONT and separates signals having different wavelengths.

A first optical signal (e.g., having a wavelength at 1310 nm) is received by the WDM 520 and separated from light having other wavelengths (to the extent necessary), and passed to a first receiver 507. A second optical signal (e.g., having a wavelength at 1490 nm) is received by the WDM 520 and separated from light having other wavelengths at an interface with a 1:2 splitter or circulator 560. In one embodiment, the splitter 560 has a splitter ratio of 10% and 90%. In one embodiment, the first wavelength is 1310 nm, the second wavelength is 1490 nm, and the spectral proportion of the splitter is 1 to 9.

Furthermore, a predetermined proportion (e.g., about 10%) of an output of the splitter 560 interfaces with a second receiver 562 to receive the 1490 nm optical signal (e.g., the second signal) reflected back by the fiber. In addition, the remainder (about 90%) of the output of the splitter interfaces with a first laser device 506 in order to output the coupled 1490 nm optical signal (e.g., the second signal) output from the first laser device 506.

The network data signal driver 504 and the limiting amplifier 505 function similarly to the embodiment described in FIG. 4. In addition, the function of the OTDR data processing module 510 is substantially the same as that of the OTDR data processing module 410 of FIG. 4. However, output pulse signals transmitted via a pulse driver (e.g., pulse driver module) 563 interface with a bias current connecting wire between the driver 504 and the first laser device 506. Therefore, the output pulse signal of the pulse driver module 563 may have a power or amplitude that is about 5%-10% of the data signal. Thus, when the data signal has a high digital logic value (e.g., a "1"), it can be superposed and/or overlaid with an OTDR pulse signal having an amplitude of approximately 5%-10% of the data signal.

A limitation of the fiber length test may occur due to the amplitude of the OTDR pulse signals of FIG. 5 when it is relatively small (e.g., 5%-10% of the data signal) and the relatively low pulse power input to a fiber. Thus, to test a fiber having the same length as the fiber in FIG. 4, the OTDR pulse may be encoded in a special encoding mode, such as Pseudo-Random Binary Sequence (PRBS) encoding or complementary Gray coding, to increase the quantity or amplitude of the test pulse and/or the optical power to be injected into the fiber. Based on the numerical algorithms in the encoding mode(s), a data receiving terminal can retrieve or determine the numerical value of each sampling data point to generate OTDR monitoring and/or test curve(s) similar to the embodiment of FIG. 4. Also, similar to the embodiment of FIG. 4, the OTDR test curve and/or monitoring data of FIG. 5 can be reported to a monitoring terminal via the IIC interface 503 coupled to the MCU 508.

By comparison, the transceiver of FIG. 4 is little more efficient than the transceiver of FIG. 5. Although the device of FIG. 5 can be integrated in the OLT optical transceiver 500 relatively easily, with lower hardware costs than the device of FIG. 4, the test algorithm may be more complicated than the device of FIG. 4 since the OTDR pulse may uses special encoding. Furthermore, the data signal is overlaid with an OTDR pulse signal whose amplitude is 5%-10% of the data signal in FIG. 5, which has a minor effect on the transmitting optical power and optical eye pattern of the OLT module 510, instead of an effect on the system's performance.

The present optical transceiver (or OLT) integrated with an OTDR monitoring function advantageously can protect conventional OLT optical transceivers and guarantee successful monitoring of the data (e.g., via the IIC interface). Furthermore, the embodiments of the present invention can advantageously simplify network wiring and decrease PON system and network costs by decreasing the number of OTDR devices and/or WDMs.

CONCLUSION/SUMMARY

Thus, the present invention provides an optical transceiver comprising an optical device comprising a wavelength division multiplexing system (WDM), a data signal driver, a data signal limiting amplifier, and an optical time domain reflectometer (OTDR) data processing module. The present optical transceiver advantageously integrates the OTDR data processing module in an optical line terminal (OLT) to protect the optical transceiver and guarantee successful monitoring of the data. The present invention can advantageously simplify network wiring and decrease costs in a PON network by decreasing the number of OTDR modules and WDM units.

The foregoing descriptions of specific embodiments of the present invention have been presented for purposes of illustration and description, and many modifications and variations are possible in light of the above teachings. The descriptions are not intended to limit the invention to the above described embodiments. On the contrary, the invention is intended to cover new feature or any combination thereof, as well as steps of any new method or procedure, or any new combination thereof that may be included within the spirit and scope of the specification. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An optical transceiver, comprising:
   a) an optical device comprising a wavelength division multiplexor (WDM) therein;
   b) a data signal driver;
   c) a data signal limiting amplifier; and
   d) an optical time domain reflectometer (OTDR) data processing module comprising an acquisition module, a pulse driving module, and a pulse signal generating and processing module, wherein said pulse driving module interfaces with a bias current between said data signal driver and a laser device driven by said data signal driver, said pulse driving module transmits test pulse signals, and said test pulse signals have an amplitude of 5%-10% of a data signal amplitude.

2. The optical transceiver of claim 1, wherein said WDM comprises a three band WDM comprising a first band, a second band, and a third band.

3. The optical transceiver of claim 2, wherein said first band is configured to receive signals from an external device in a network comprising said optical transceiver, and said optical device is configured to output said optical signals at said second band.

4. The optical transceiver of claim 2, wherein said third band is an operating wavelength of said OTDR data processing module.

5. The optical transceiver of claim 2, wherein said optical device comprises first and second laser devices, said first laser device is driven by said driver, and said second laser device issues OTDR test signals.

6. The optical transceiver of claim 1, wherein said data signal limiting amplifier is configured to amplify and/or reshape said electronic signals from a first receiver, and then output amplified electronic signals.

7. The optical transceiver of claim 5, further comprising a second receiver configured to receive fiber-reflected OTDR test signals.

8. The optical transceiver of claim 5, further comprising a combiner or circulator configured to couple said OTDR test signals to said WDM via said combiner or circulator.

9. The optical transceiver of claim 5, wherein said OTDR data processing module generates pulse signals as a signal source of said second laser device, while said second receiver converts fiber-reflected pulse signals into electronic signals amplified by said OTDR data processing module and converted into digital signals via an analog-to-digital converter.

10. The optical transceiver of claim 1, wherein said WDM receives a signal from an optical network unit (ONU) and separates signals having different wavelengths to capture a first wavelength signal and a second wavelength signal.

11. The optical transceiver of claim 10, wherein said WDM provides said first wavelength signal to a first receiver, and said optical transceiver further comprises an optical splitter having (i) a first output terminal configured to process an output signal from a first laser device in said optical device and (ii) a second output terminal configured to provide said second wavelength signal to a second receiver.

12. The optical transceiver of claim 1, wherein said OTDR data processing module encodes said test pulses using a Pseudo-Random Binary Sequence (PRBS) or complementary Gray coding.

13. The optical transceiver of claim 1, further comprising an inter-integrated circuit (IIC) interface configured to monitor OTDR test data and/or test curve(s).

14. A method of monitoring an optical transceiver, comprising:
   a) receiving optical signals from an optical network unit (ONU) or an optical line terminal (OLT) in a first band of a wavelength division multiplexor (WDM) in the optical transceiver;

b) converting said optical signals into electronic signals in a first receiver;

c) outputting an optical data signal in a second band of said WDM;

d) transmitting test pulse signals from a pulse driving module of an optical time domain reflectometer (OTDR) data processing module in a third band of said WDM, wherein the OTDR data processing module comprising an acquisition module, said pulse driving module, and a pulse signal generating and processing module, and said pulse driving module interfaces with a bias current between a data signal driver and a laser device that outputs said optical data signal, and said test pulse signals have an amplitude of 5%-10% of a data signal amplitude; and e) receiving a fiber-reflected test signal from said WDM in said OTDR.

15. The method of claim 14, wherein said optical data signal is issued from a first laser device coupled to said WDM, and said test signal is issued from a second laser device coupled to said WDM via a combiner or circulator.

16. The method of claim 14, wherein said optical signals are received by a first receiver configured to convert said optical signals to electronic signals, and said method further comprises amplifying and/or reshaping said electronic signals.

17. The method of claim 16, wherein said fiber-reflected test signal is received by a second receiver coupled to said OTDR data processing module.

18. The method of claim 14, further comprising monitoring and reporting test data to an external device over an inter-integrated circuit (IIC) interface.

19. The method of claim 14, further comprising encoding said test pulse signals using a Pseudo-Random Binary Sequence (PRBS) or complementary Gray coding.

20. The optical transceiver of claim 1, further comprising a microcontroller coupled to the pulse signal generating and processing module of the OTDR data processing module.

21. The optical transceiver of claim 1, wherein the microcontroller communicates with the pulse signal generating and processing module and with an external device via an inter-integrated circuit (IIC) interface.

* * * * *